United States Patent
Mousseau et al.

(10) Patent No.: US 7,107,341 B2
(45) Date of Patent: Sep. 12, 2006

(54) SYSTEM AND METHOD OF MANAGING INFORMATION DISTRIBUTION TO MOBILE STATIONS

(75) Inventors: Gary P. Mousseau, Waterloo (CA); Barry J. Gilhuly, Waterloo (CA)

(73) Assignee: Research In Motion Limited, Waterloo (CA)

( * ) Notice: Subject to any disclaimer, the term of this patent is extended or adjusted under 35 U.S.C. 154(b) by 524 days.

(21) Appl. No.: 10/313,103

(22) Filed: Dec. 6, 2002

(65) Prior Publication Data
US 2003/0109272 A1 Jun. 12, 2003

Related U.S. Application Data

(60) Provisional application No. 60/340,300, filed on Dec. 7, 2001.

(51) Int. Cl.
*G06F 13/00* (2006.01)
(52) U.S. Cl. ............... 709/224; 709/219; 709/225; 709/227
(58) Field of Classification Search ............ 709/206, 709/217, 219, 227, 228
See application file for complete search history.

(56) References Cited

U.S. PATENT DOCUMENTS

| | | | |
|---|---|---|---|
| 4,106,060 A | 8/1978 | Chapman, Jr. |
| 4,417,349 A | 11/1983 | Hills et al. |
| 4,438,433 A | 3/1984 | Smoot et al. |
| 4,558,454 A | 12/1985 | Hills et al. |
| 4,644,351 A | 2/1987 | Zabarsky et al. |
| 4,695,880 A | 9/1987 | Johnson et al. |
| 4,697,281 A | 9/1987 | O'Sullivan |
| 4,713,780 A | 12/1987 | Schultz et al. |
| 4,768,087 A | 8/1988 | Taub et al. |
| 4,837,798 A | 6/1989 | Cohen et al. |
| 4,837,800 A | 6/1989 | Freeburg et al. |
| 4,845,658 A | 7/1989 | Gifford |
| 4,856,047 A | 8/1989 | Saunders |
| 4,928,096 A | 5/1990 | Leonardo et al. |
| 4,951,044 A | 8/1990 | Nelson et al. |
| 4,972,457 A | 11/1990 | O'Sullivan |
| 4,980,907 A | 12/1990 | Raith et al. |
| 5,008,926 A | 4/1991 | Misholi |
| 5,043,721 A | 8/1991 | May |
| 5,068,916 A | 11/1991 | Harrison et al. |
| 5,086,502 A | 2/1992 | Malcolm |
| 5,125,021 A | 6/1992 | Lebowitz |
| 5,127,041 A | 6/1992 | O'Sullivan |

(Continued)

FOREIGN PATENT DOCUMENTS

AU 7843498 2/1999

(Continued)

OTHER PUBLICATIONS

Feibus, "A Desktop In Your Palm", Informationweek, Aug. 25, 1997, pp. 65ff.

(Continued)

*Primary Examiner*—Viet D. Vu
(74) *Attorney, Agent, or Firm*—Jones Day; Krishna K. Pathiyal; Robert C. Liang

(57) ABSTRACT

A system for managing information distribution to a mobile station in communication with a wireless network includes a host service operable to receive a data item associated with the mobile station and determine whether a network resource is associated with the mobile station, and upon a negative determination is further operable to transmit an out-of-band message to the mobile station to instruct the mobile station to acquire the network resource.

11 Claims, 9 Drawing Sheets

U.S. PATENT DOCUMENTS

| | | |
|---|---|---|
| 5,128,981 A | 7/1992 | Tsukamoto et al. |
| 5,136,291 A | 8/1992 | Teague |
| 5,157,660 A | 10/1992 | Kuwahara et al. |
| 5,159,592 A | 10/1992 | Perkins |
| 5,177,680 A | 1/1993 | Tsukino et al. |
| 5,181,200 A | 1/1993 | Harrison |
| 5,210,785 A | 5/1993 | Sato et al. |
| 5,265,033 A | 11/1993 | Vajk et al. |
| 5,283,887 A | 2/1994 | Zachery |
| 5,293,250 A | 3/1994 | Okumura et al. |
| 5,299,255 A | 3/1994 | Iwaki et al. |
| 5,307,059 A | 4/1994 | Connary et al. |
| 5,313,582 A | 5/1994 | Hendel et al. |
| 5,315,635 A | 5/1994 | Kane et al. |
| 5,333,152 A | 7/1994 | Wilber |
| 5,333,266 A | 7/1994 | Boaz et al. |
| 5,370,566 A | 12/1994 | Mitchell, Jr. et al. |
| 5,392,390 A | 2/1995 | Crozier |
| 5,406,557 A | 4/1995 | Baudoin |
| 5,410,543 A | 4/1995 | Seitz et al. |
| 5,416,473 A | 5/1995 | Dulaney, III et al. |
| 5,416,842 A | 5/1995 | Aziz |
| 5,436,960 A | 7/1995 | Campana, Jr. et al. |
| 5,438,611 A | 8/1995 | Campana, Jr. et al. |
| 5,452,356 A | 9/1995 | Albert |
| 5,479,472 A | 12/1995 | Campana, Jr. et al. |
| 5,487,100 A | 1/1996 | Kane |
| 5,493,692 A | 2/1996 | Theimer et al. |
| 5,495,484 A | 2/1996 | Self et al. |
| 5,559,800 A | 9/1996 | Mousseau et al. |
| 5,572,528 A | 11/1996 | Shuen |
| 5,579,472 A | 11/1996 | Keyworth, II et al. |
| 5,588,009 A | 12/1996 | Will |
| 5,598,536 A | 1/1997 | Slaughter, III et al. |
| 5,603,054 A | 2/1997 | Theimer et al. |
| 5,604,491 A | 2/1997 | Coonley et al. |
| 5,604,788 A | 2/1997 | Tett |
| 5,613,108 A | 3/1997 | Morikawa |
| 5,625,670 A | 4/1997 | Campana, Jr. et al. |
| 5,627,829 A | 5/1997 | Gleeson et al. |
| 5,630,060 A | 5/1997 | Tang et al. |
| 5,631,946 A | 5/1997 | Campana, Jr. et al. |
| 5,633,810 A | 5/1997 | Mandal et al. |
| 5,638,450 A | 6/1997 | Robson |
| 5,666,530 A | 9/1997 | Clark et al. |
| 5,666,553 A | 9/1997 | Crozier |
| 5,673,322 A | 9/1997 | Pepe et al. |
| 5,701,423 A | 12/1997 | Crozier |
| 5,705,995 A | 1/1998 | Laflin et al. |
| 5,706,211 A | 1/1998 | Beletic et al. |
| 5,727,202 A | 3/1998 | Kucala |
| 5,729,735 A | 3/1998 | Meyering |
| 5,737,531 A | 4/1998 | Ehley |
| 5,742,905 A | 4/1998 | Pepe et al. |
| 5,745,689 A | 4/1998 | Yeager et al. |
| 5,751,960 A | 5/1998 | Matsunaga |
| 5,751,971 A | 5/1998 | Dobbins et al. |
| 5,754,954 A | 5/1998 | Cannon et al. |
| 5,757,901 A | 5/1998 | Hiroshige |
| 5,758,088 A | 5/1998 | Bezaire et al. |
| 5,758,150 A | 5/1998 | Bell et al. |
| 5,761,416 A | 6/1998 | Mandal et al. |
| 5,764,639 A | 6/1998 | Staples et al. |
| 5,765,170 A | 6/1998 | Morikawa |
| 5,781,614 A | 7/1998 | Brunson |
| 5,781,901 A | 7/1998 | Kuzma |
| 5,790,790 A | 8/1998 | Smith et al. |
| 5,790,974 A | 8/1998 | Tognazzini |
| 5,796,806 A | 8/1998 | Birckbichler |
| 5,812,671 A | 9/1998 | Ross, Jr. |
| 5,812,819 A | 9/1998 | Rodwin et al. |
| 5,813,016 A | 9/1998 | Sumimoto |
| 5,815,081 A | 9/1998 | Motohashi |
| 5,819,172 A | 10/1998 | Campana, Jr. et al. |
| 5,819,284 A | 10/1998 | Farber et al. |
| 5,822,434 A | 10/1998 | Caronni et al. |
| 5,826,062 A | 10/1998 | Fake, Jr. et al. |
| 5,838,252 A | 11/1998 | Kikinis |
| 5,838,926 A | 11/1998 | Yamagishi |
| 5,844,969 A | 12/1998 | Goldman et al. |
| 5,850,219 A | 12/1998 | Kumomura |
| 5,850,444 A | 12/1998 | Rune |
| 5,862,321 A | 1/1999 | Lamming et al. |
| 5,867,660 A | 2/1999 | Schmidt et al. |
| 5,878,434 A | 3/1999 | Draper et al. |
| 5,881,235 A | 3/1999 | Mills |
| 5,889,845 A | 3/1999 | Staples et al. |
| 5,903,723 A | 5/1999 | Beck et al. |
| 5,905,777 A | 5/1999 | Foladare et al. |
| 5,917,629 A | 6/1999 | Hortensius et al. |
| 5,928,329 A | 7/1999 | Clark et al. |
| 5,937,161 A | 8/1999 | Mulligan et al. |
| 5,941,954 A | 8/1999 | Kalajan |
| 5,941,956 A | 8/1999 | Shirakihara et al. |
| 5,948,066 A | 9/1999 | Whalen et al. |
| 5,951,636 A | 9/1999 | Zerber |
| 5,953,322 A | 9/1999 | Kimball |
| 5,961,590 A | 10/1999 | Mendez et al. |
| 5,964,833 A | 10/1999 | Kikinis |
| 5,966,663 A | 10/1999 | Gleason |
| 5,968,131 A | 10/1999 | Mendez et al. |
| 5,969,636 A | 10/1999 | Parvulescu et al. |
| 5,973,612 A | 10/1999 | Deo et al. |
| 5,974,180 A | 10/1999 | Schwendeman |
| 5,974,238 A | 10/1999 | Chase, Jr. |
| 5,978,689 A | 11/1999 | Tuoriniemi et al. |
| 5,978,837 A | 11/1999 | Foladare et al. |
| 5,983,073 A | 11/1999 | Ditzik |
| 5,987,508 A | 11/1999 | Agraharam et al. |
| 5,995,597 A | 11/1999 | Woltz et al. |
| 6,000,000 A | 12/1999 | Hawkins et al. |
| 6,006,274 A | 12/1999 | Hawkins et al. |
| 6,014,429 A | 1/2000 | LaPorta et al. |
| 6,018,762 A | 1/2000 | Brunson et al. |
| 6,023,700 A | 2/2000 | Owens et al. |
| 6,023,708 A | 2/2000 | Mendez et al. |
| 6,034,621 A | 3/2000 | Kaufman |
| 6,035,104 A | 3/2000 | Zahariev |
| 6,052,563 A | 4/2000 | Macko |
| 6,052,735 A | 4/2000 | Ulrich et al. |
| 6,058,431 A | 5/2000 | Srisuresh et al. |
| 6,073,165 A | 6/2000 | Narasimhan et al. |
| 6,078,826 A | 6/2000 | Croft et al. |
| 6,084,969 A | 7/2000 | Wright et al. |
| 6,085,192 A | 7/2000 | Mendez et al. |
| 6,085,231 A | 7/2000 | Agraharam et al. |
| 6,085,232 A | 7/2000 | Kikinis |
| 6,091,951 A | 7/2000 | Sturniolo et al. |
| 6,092,114 A | 7/2000 | Shaffer et al. |
| 6,092,191 A | 7/2000 | Shimbo et al. |
| 6,101,531 A | 8/2000 | Eggleston et al. |
| 6,115,394 A | 9/2000 | Balachandran et al. |
| 6,115,736 A | 9/2000 | Devarakonda et al. |
| 6,125,281 A | 9/2000 | Wells et al. |
| 6,125,369 A | 9/2000 | Wu et al. |
| 6,128,739 A | 10/2000 | Fleming, III |
| 6,130,892 A | 10/2000 | Short et al. |
| 6,131,096 A | 10/2000 | Ng et al. |
| 6,131,116 A | 10/2000 | Riggins et al. |
| 6,134,314 A * | 10/2000 | Dougherty et al. .... 379/201.01 |
| 6,134,432 A | 10/2000 | Holmes et al. |
| 6,138,146 A | 10/2000 | Moon et al. |
| 6,141,690 A | 10/2000 | Weiman |
| 6,144,671 A | 11/2000 | Perinpanathan et al. |

| | | | |
|---|---|---|---|
| 6,144,997 A | 11/2000 | Lamming et al. | |
| 6,151,606 A | 11/2000 | Mendez | |
| 6,154,745 A * | 11/2000 | Kari et al. | 707/100 |
| 6,154,839 A | 11/2000 | Arrow et al. | |
| 6,157,318 A | 12/2000 | Minata | |
| 6,157,630 A | 12/2000 | Adler et al. | |
| 6,157,950 A | 12/2000 | Krishnan | |
| 6,163,274 A | 12/2000 | Lindgren | |
| 6,163,532 A * | 12/2000 | Taguchi et al. | 370/338 |
| 6,167,379 A | 12/2000 | Dean et al. | |
| 6,170,057 B1 | 1/2001 | Inoue et al. | |
| 6,178,331 B1 | 1/2001 | Holmes et al. | |
| 6,185,603 B1 | 2/2001 | Henderson et al. | |
| 6,219,694 B1 | 4/2001 | Lazaridis et al. | |
| 6,233,341 B1 | 5/2001 | Riggins | |
| 6,240,088 B1 | 5/2001 | Gayton et al. | |
| 6,249,820 B1 | 6/2001 | Dobbins et al. | |
| 6,256,666 B1 | 7/2001 | Singhal | |
| 6,272,545 B1 | 8/2001 | Flanagin et al. | |
| 6,275,848 B1 | 8/2001 | Arnold | |
| 6,275,850 B1 | 8/2001 | Beyda et al. | |
| 6,292,668 B1 | 9/2001 | Alanara et al. | |
| 6,311,282 B1 | 10/2001 | Nelson et al. | |
| 6,314,519 B1 | 11/2001 | Davis et al. | |
| 6,324,544 B1 | 11/2001 | Alam et al. | |
| 6,356,956 B1 | 3/2002 | Deo et al. | |
| 6,400,958 B1 | 6/2002 | Isomursu et al. | |
| 6,628,194 B1 * | 9/2003 | Hellebust et al. | 340/7.5 |
| 6,782,412 B1 * | 8/2004 | Brophy et al. | 709/204 |
| 6,839,323 B1 * | 1/2005 | Foti | 370/235 |
| 6,876,728 B1 * | 4/2005 | Kredo et al. | 379/88.17 |
| 2001/0001552 A1 | 5/2001 | Vong et al. | |
| 2001/0005675 A1 * | 6/2001 | Aho | 455/412 |
| 2001/0015977 A1 | 8/2001 | Johansson | |
| 2001/0029531 A1 | 10/2001 | Ohta | |
| 2001/0040693 A1 | 11/2001 | Saito et al. | |
| 2001/0042093 A1 | 11/2001 | Shirai et al. | |
| 2001/0054072 A1 | 12/2001 | Discolo et al. | |
| 2002/0080822 A1 * | 6/2002 | Brown et al. | 370/475 |
| 2002/0129107 A1 * | 9/2002 | Loughran et al. | 709/206 |
| 2003/0060197 A1 * | 3/2003 | Benes et al. | 455/433 |

FOREIGN PATENT DOCUMENTS

| | | |
|---|---|---|
| DE | 19961345 | 6/2001 |
| EP | 0617373 | 9/1994 |
| EP | 0736989 | 10/1996 |
| EP | 0772327 | 5/1997 |
| EP | 0777394 | 6/1997 |
| EP | 0788267 | 8/1997 |
| EP | 0793387 | 8/1997 |
| EP | 0825788 | 2/1998 |
| EP | 0838774 | 4/1998 |
| EP | 0838934 | 4/1998 |
| EP | 0772327 | 2/1999 |
| EP | 0918417 | 5/1999 |
| EP | 0930766 | 7/1999 |
| EP | 0986225 | 3/2000 |
| JP | 9305155 | 1/1997 |
| JP | 11289346 | 10/1999 |
| WO | 9619064 | 6/1996 |
| WO | 9726709 | 7/1997 |
| WO | 9727717 | 7/1997 |
| WO | 9732251 | 9/1997 |
| WO | 9733421 | 9/1997 |
| WO | 9741654 | 11/1997 |
| WO | 9744942 | 11/1997 |
| WO | 9800787 | 1/1998 |
| WO | 9821911 | 5/1998 |
| WO | 9823108 | 5/1998 |
| WO | 9826344 | 6/1998 |
| WO | 9848560 | 10/1998 |
| WO | 9905620 | 2/1999 |
| WO | 9905813 | 2/1999 |
| WO | 9906900 | 2/1999 |
| WO | 9912365 | 3/1999 |
| WO | 9917505 | 4/1999 |
| WO | 9919988 | 4/1999 |
| WO | 9936870 | 7/1999 |
| WO | 9945484 | 9/1999 |
| WO | 9945684 | 9/1999 |
| WO | 9948312 | 9/1999 |
| WO | 9950974 | 10/1999 |
| WO | 9963709 | 12/1999 |
| WO | 0011567 | 3/2000 |
| WO | 0011832 | 3/2000 |
| WO | 0020994 | 4/2000 |
| WO | 0113572 | 2/2001 |
| WO | 0113656 | 2/2001 |
| WO | 0141472 | 6/2001 |
| WO | 0167716 | 6/2001 |
| WO | 0171539 | 9/2001 |

OTHER PUBLICATIONS

Behr, "Handheld Solutions", Informationweek, Oct. 27, 1997, pp. 106-113.

Moody's Investors Service, Socket Communications Inc.—History & Debt, Investex Report No. 3240276.

Newsletter, E-Mail Merges With Voice Through Infinite Technologies, Voice Technology & Services News, May 26, 1998.

Newsletter, VODAPAGE: Vodapage demos increasing convergence of pagers and mobile communications at TMA 29, Md Presswire, Nov. 28, 1996.

Mosher, Microsoft Exchange User's Handbook, Duke Press, 1997, pp. 547-549.

Copy of DTS Wireless Website located at D.R.L. http://www.dtswireless.com.

"3Com PalmPilot Gets Wireless Link for E-Mail", Spooner, John G., PC Week, Dec. 8, 1997.

"Have Your Pager Call My Pager", Sullivan, Kristina B., PC Week, Dec. 8, 1997.

Briere, Daniel, et al., "One Mailbox, Just Like Old Times," Network World, vol. 14, issue 16, p. 21 (Apr. 21, 1997).

Padwick, et al., Special Edition Using Microsoft Outlook 97, 1997, Que Corporation, pp. 250-251, 353-367.

News Release, "Motorola Rings in 1995 with the Launch of the Marco® Wireless Communicator," Jan. 4, 1995 (4 pgs.).

Timeline, "FLEX™ Technology Timeline," (3 pgs.).

General Magic, Inc., Corporate Backgrounder, 2001 (2 pgs.).

Pegasus Email Settings, ABSnet Internet Services, Inc. (4 pgs.).

Motorola, Inc., emailVClient, 2001 (4 pages).

News Release, "Motorola Announces Pagewriter 250, The World's Smallest Pager with Full Keyboard", Feb. 27, 1997 (2 pgs.).

Dewey, Barney, "Communications Strategies for Newton 2.0," Newton Technology, p. 10, Jun. 1996.

Press Release, "Motorola Announces New Solutions to Provide Consumers with Wireless Access to Personal and Enterprise E-mail Accounts," Mar. 21, 2001 (4 pgs.).

"Motorola's 'Marco' Wireless Communicator," http://www.msu.edu/-luckie/gallery/marco.htm, Jun. 14, 2001 (3 pgs.).

News Release, "CE Software Announces MobileVision," Editorial Contacts, CE Software, Inc., 1995 (3 pgs.).

News Release, "CE Software Ships MobileVision," Jun. 20, 1995 (3 pgs.).

Newton Reference, Communications, 1996-1997(4 pgs.).

PC Pro Issue 31: Realworld Computing, PDA, Column, Jul. 30, 1997 (7 pgs.).

Enterprise Solutions for Email Overload, Founder Publications, http://www.amikanow.com/corporte/publications.htm, Aug. 6, 2001 (9 pgs.).

"Motorola's 'Macro' Wireless Communicator," http://www.msu.edu/-luckie/gallery/marco.htm, Aug. 6, 2001 (2 pgs.).

Press Release, "Apple Agrees to License Newton Technology to Schlumberger, Digital Ocean," Nov. 3, 1995 (3 pgs.).

Frezza, Bill, "PDA, PDA, Wherefore Art Thou, PDA?", Freewire, Aug. 6, 2001 (6 pgs.).
Black, Lauren, et al., "Personal Digital Assistants," Macworld Reviews, Aug. 6, 2001 (5 pgs.).
Reference, "MobileVision Direct Wireless Connections to Your LAN-Based Electronic Mailbox," CE Software, Inc., pp. 1, 3, 5, 7, 9, 11, 13, 15, 17, 19, 21, 1995.
User Manual, "MobileVision Direct Wireless Connection to Your LAN-Based Electronic Mailbox," CE Software, Inc. 1995.
Johnson, David B., "Ubiquitous Mobile Host Internetworking," Fourth Workshop on Workstation Operating Systems, pp. 85-90, Oct. 14-15, 1993.
Johnson, David B., "Mobile Host Internetworking Using IP Loose Source Routing," School of Computer Science, Carnegie Mellon University, pp. 1-14 Feb. 1993.
Schoettle, Bob, "IP-Address Management on LANs," Byte, pp. 199-200, Feb. 1996.
Cheshire, Stuart, et al., "Internet Mobility 4×4," Computer Science Department, Stanford University, pp. 1-12, Aug. 1996.
Yeom, Hoen Y., et al., "IP Multiplexing by Transparent Port-Address Translator," Proceedings of the Tenth USENIX System Administration Conference, pp. 113-122, Sep. 29-Oct. 4, 1996.
Johnson, David B., "Scalable and Robust Internetworking Routing for Mobile Hosts," IEEE Computer Society, pp. 2-11, 1994.
Egevang, K. et al., "The IP Network Address Translator," Network Working Group, pp. 1-10, May 1994.
Manual, "Server and BBS Software for the Packet Radio" by Jean Paul Roubelat, pp. 1-173.
Book, "Internetwork Mobility The CDPD Approach," by Mark S. Taylor, William Waung, and Mohsen Banan, Jun. 11, 1996.
"BlackBerry Technical White Paper," Research In Motion Ltd., Version 1.0, 1998-1999.
Newsletter, "Battery Friendly Bulletin," vol. 1, Issue 3, pp. 1-7 and unnumbered page, 1999.
Article, Comerford, "Handhelds Duke It Out for Internet," Wireless Internet, pp. 35-38 and 41, Aug. 2000.
Press Detail, "Extended Systems and Motorola Bring Short-Range Wireless to the Paging E-volution," Jan. 13, 2000 (3 pgs.).
Press Detail, "3Com Corporation Licenses Bluetooth Technology from Extended Systems," Feb. 22, 2000 (2 pgs.).
Web site Article, Hawaleshka, "The Web in Your Pocket," Maclean's, May 15, 2000 (3 pgs.).
Claxton, "Messaging API's for Voice Networks," Telecommunications, pp. 116-120, 1998.
Gifford, David K., et al., "The Application of Digital Broadcast Communication to Large Scale Information Systems," IEEE Journal on Selected Areas in Communications, vol. SAC-3, No. 3, pp. 457-467 (May 1985).
Gifford, David K., et al., "An Architecture for Large Scale Information Systems," ACM, pp. 161-170 (1985).
Arnum, Eric, "The Universal Mailbox Arrives . . . Sort Of," Business Communications Review, pp. 49-52 (May 1996).
"Wireless E-Mail Services Gain Windows Clients," Kramer, Matt, PC Week, Apr. 17, 1995.

Perkins, C. et al., "IMHP: A Mobile Host Protocol For The Internet," Computer Networks And ISDN Systems 27 (1994), pp. 479-491.
Inouye, Jon et al., "System Support for Mobile Multimedia Applications," Proceedings of the IEEE 7$^{th}$ International Workshop on Network And Operating System Support For Digital Audio And Video, May 19-21, 1997, pp. 135-146.
Xu, Kevin Houzhi, "Reliable Stream Transmission Protocols In Mobile Computing Environments", Bell Labs Technical Journal, Summer 1997, pp. 152-163.
Lavana, Hemang et al.., "Internet-Based Workflows: A Paradigm For Dynamically Reconfigurable Desktop Environments," Conference on Supporting Group Work, Proceedings of the International ACM SIGGROUP Conference on Supporting Group Work: The Integration Challenge, Nov. 16-19, 1997, pp. 204-213.
Perkins, Charles E. et al., "Mobility Support In IPv6," International Conference on Mobile Computing and Networking, Proceeding of the Second Annual International Conference on Mobile Computing and Networking, Nov. 11-12, 1996, pp. 27-37.
Goldszmidt, German et al., "*ShockAbsorber*: A TCP Connection Router," Globecom 97, IEEE Global Telecommuncations Conference, Nov. 3-8, 1997, pp. 1919-1923.
SAM Reference Manual, System for Automated Messages (Sep. 1989).
IBM Portable Terminal User's Guide, Third Edition (Jun. 1985).
Binder, Richard et al, The Alohanet Menehune, University of Hawaii, Version II (Sep. 1974).
Computer-Structures—Principles and Examples, McGraw Hill (1982).
Krebs, Jay, Portable Computer and Host Talk Over Radio-Frequency Link, Electronic, pp. 142-145 (Aug. 25, 1983).
TeamOn Product Highlight Data Sheet (4 pgs).
TeamOn Online Office and Mobile Office Web Pages (24 pgs).
Gadol, Steve, et al. "Nomadic Tenets- A User's Perspective," Sun Microsystems Laboratories, Inc., pp. 1-16 (Jun. 1994).
Declaration of David A. Keeney regarding SAM System, pp. 1-33 (Sep. 3, 2002).
"SAM™ integrates E-mail, Alpha Paging, Fax, and more!", SAM System for Automated Messages (10 pgs.).
SAMpage Manual, version 2.0, TeckNow! (Feb. 1990).
Reiter, Alan A., "Focus on Technology," Telocator (Jan. 1990) (4 pgs.).
Kuehn, Carl, "More than EMail," Southwest Computer & Business Equipment Review, vol. VII, No. 2, (Feb. 1990) (1 pg.).
SAM System for Automated Messages User's Manual (1988) (17 pgs.).
Motorola Operating Instructions for Your "PMR 2000" Series Display Radio Pagers Personal Message Center (2000) (7 pgs.).
Motorola PMR 2000 Personal Message Receiver POCSAG (CCIR Radio Paging Code #1) (1986) (6 pgs.)
Undated, Information Display Pager D40, NEC Corporation (6 pgs.).

* cited by examiner

SYSTEM AND METHOD OF MANAGING INFORMATION DISTRIBUTION TO MOBILE STATIONS

This application claims benefit of U.S. Provisional Application Ser. No. 60/340,300, filed Dec. 7, 2001, the entire disclosure of which is incorporated herein by reference.

BACKGROUND

1. Field of the Invention

The present invention is directed to the field of data communications in a wireless network. More particularly, the present invention relates to a system and method for managing information distribution to mobile stations in a wireless network.

2. Description of the Related Art

Emerging wireless data networks, such as the General Packet Radio Service (GPRS) network, may utilize the Internet Protocol (IP) for routing data to mobile stations. The most popular IP standard, IP version 4 (IPv4), has limited addressing capability and thus utilizes a dynamic addressing scheme. In the dynamic addressing scheme, a pool of available network addresses is dynamically assigned to a much greater pool of mobile stations depending on which mobile stations are accessing the network. Additional network resources, such as a Packet Data Protocol (PDP) context in the GPRS network, are allocated to mobile stations when the mobile stations are accessing the network.

An emerging IP standard, IP version 6 (IPv6), provides substantially permanent IP addresses due to a much larger address space, and thus the dynamic addressing scheme used in IPv4 is unnecessary. In an IPv6 network, however, additional network resources, such as the PDP context in the GPRS network, are still dynamically allocated to mobile stations when the mobile stations are accessing the network.

SUMMARY

A system for managing information distribution between a computer network and mobile stations in communication with a wireless network comprises one or more host services and a network resource monitor. Each host service is operable to receive data items associated with mobile stations, and for each data item, to determine from a resource status of network resources associated with the mobile stations whether a network resource is associated with a mobile station. Upon a negative determination, each host service is further operable to transmit an out-of-band message (or signal) to the mobile station to instruct the mobile station to acquire the network resource and to transmit the data item to the mobile station upon receiving a confirmation message that the mobile station has acquired the network resource. The network resource monitor is in communication with the wireless network and the one or more host services and is operable to track the resource status of network resources associated with the mobile stations and to automatically transmit the resource status to the one or more host services.

Another system for managing information distribution to a mobile station in communication with a wireless network comprises a host service operable to receive a data item associated with the mobile station and determine whether a network resource is associated with the mobile station, and upon a negative determination is further operable to transmit an out-of-band message to the mobile station to instruct the mobile station to acquire the network resource.

Another system for managing information distribution between a host service in communication with a computer network and a mobile station in communication with a wireless network comprises a mobile station. The mobile station comprises a processing subsystem, a communication subsystem, and a memory subsystem, and is operable to receive an out-of-band network resource request over the communication subsystem and in response to the network resource request obtain a network resource in the wireless network and transmit a confirmation message to the host service indicating the mobile station has acquired the network resource.

DETAILED DESCRIPTION

Figure 1:
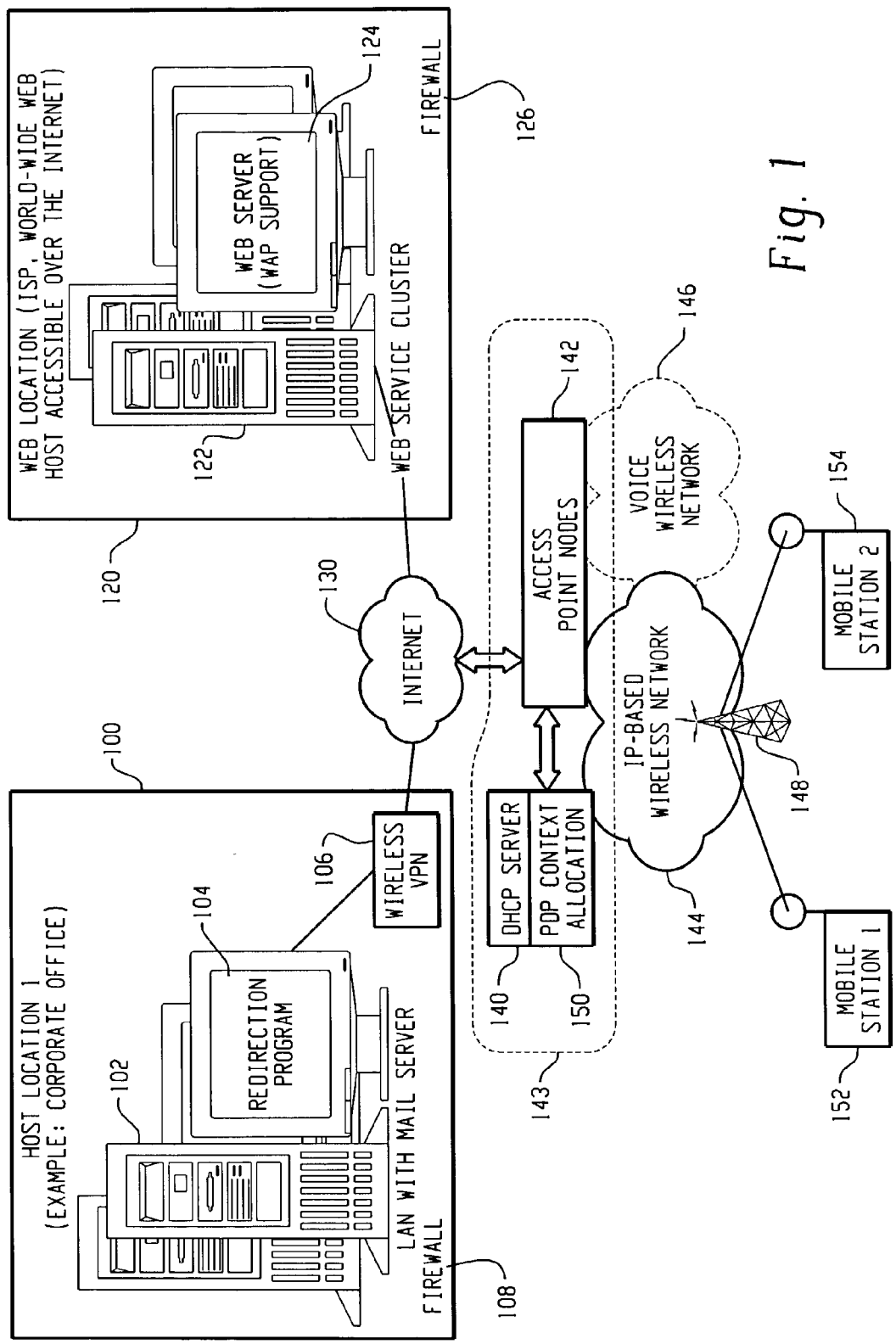
FIG. 1 is an illustration of a system for managing information distribution to mobile stations in a wireless network.

FIG. 1 is an illustration of a system for managing information distribution from host systems 100 and 120 to mobile stations 152 and 154 in communication with a wireless network 144 and voice wireless network 146. While only two host systems 100 and 120 and two mobile stations 152 and 154 are shown, the system can include additional host systems and mobile stations.

The host system 100 is illustratively a computer device 102, such as a mail server connected to a Local Area Network (LAN), running a redirector software program 104. The redirector software 104 operates in conjunction with the mail server 102 to redirect user selected information to the mobile stations 152 and 154. An exemplary mobile station may be of the type disclosed in U.S. Pat. No. 6,278,442, entitled "HAND-HELD ELECTRONIC DEVICE WITH A KEYBOARD OPTIMIZED FOR USE WITH THE THUMBS," the entire disclosure of which is incorporated herein by reference. Furthermore, an exemplary redirector software program may be of the type disclosed in U.S. Pat. No. 6,219,694, entitled "SYSTEM AND METHOD FOR PUSHING INFORMATION FROM A HOST SYSTEM TO A MOBILE DATA COMMUNICATION DEVICE HAV- ING A SHARED ELECTRONIC ADDRESS," the entire disclosure of which is incorporated herein by reference.

The redirector software 104 may exist on any machine within the corporate environment 100, preferably behind a firewall 108 operating within the LAN. A Virtual Private Network (VPN) server 106 allows users to connect to corporate services via the Internet 130. VPN servers 106 provide higher security and tunneling of network requests over the Internet 130.

The host system 120 includes another computer device 122, such as a web server, running web server software 124 that can include direct Wireless Access Protocol (WAP) support. WAP support provides mobile station 152 and 154 compatible web content for small Personal Digital Assistants (PDAs), phones and other types of mobile stations. The web server 122 may also be running an information transcoder that can efficiently transcode a first data type received at the web server 122 into a second data type of reduced size for transmission to mobile stations 152 and 154. Similarly, the web server 122 may be running an ASP (Application Service Provider) solution such as AOL, or a web portal such as Yahoo, or a wireless web solution such as GoAmerica, or some private web service offering. Usually, the web server 122 is protected by a firewall 126.

The system manages information distribution to the mobile stations 152 and 154 so that data items may be delivered asynchronously to the mobile stations 152 and 154 that are in communication with the wireless network 144 and 146. The IP-based wireless network 144 and voice wireless network 146 are illustratively IP-based networks comprising a private set of IP addresses. The wireless networks 144 and 146 are preferably implemented as one network, supporting both data and voice communications, respectively, for the mobile stations 152 and 154 though a base station 148. One example of such a network is the Global System for Mobile communications (GSM) network and GPRS network that is available world-wide and can support both voice and data through the base station 148.

The networks 144 and 146 include a network infrastructure 143 to support network services, such an Access Point Nodes (APNs) 142, SMS data services, PDP Context Allocation services 150 and Dynamic Host Configuration Protocol (DHCP) interface services 140 and others. For example, in GPRS, a PDP context is used to open an IP tunnel over the GSM/GPRS network infrastructure. The PDP context allocation 150 component is linked with DHCP services, as each PDP context is automatically assigned an IP address through DHCP. Because the wireless networks 144 and 146 operate a private, dynamically-assigned IP address space, the DHCP server 140 is responsible for allocating and deallocating network addresses to the mobile stations 152 and 154. This operation occurs in conjunction with the PDP context allocation component 150.

SMS services are available within a GSM network. The SMS messages are commonly routed over the voice network 146. Alternatively, the SMS messages may also be routed over the IP-based wireless data network 144.

Figure 2:
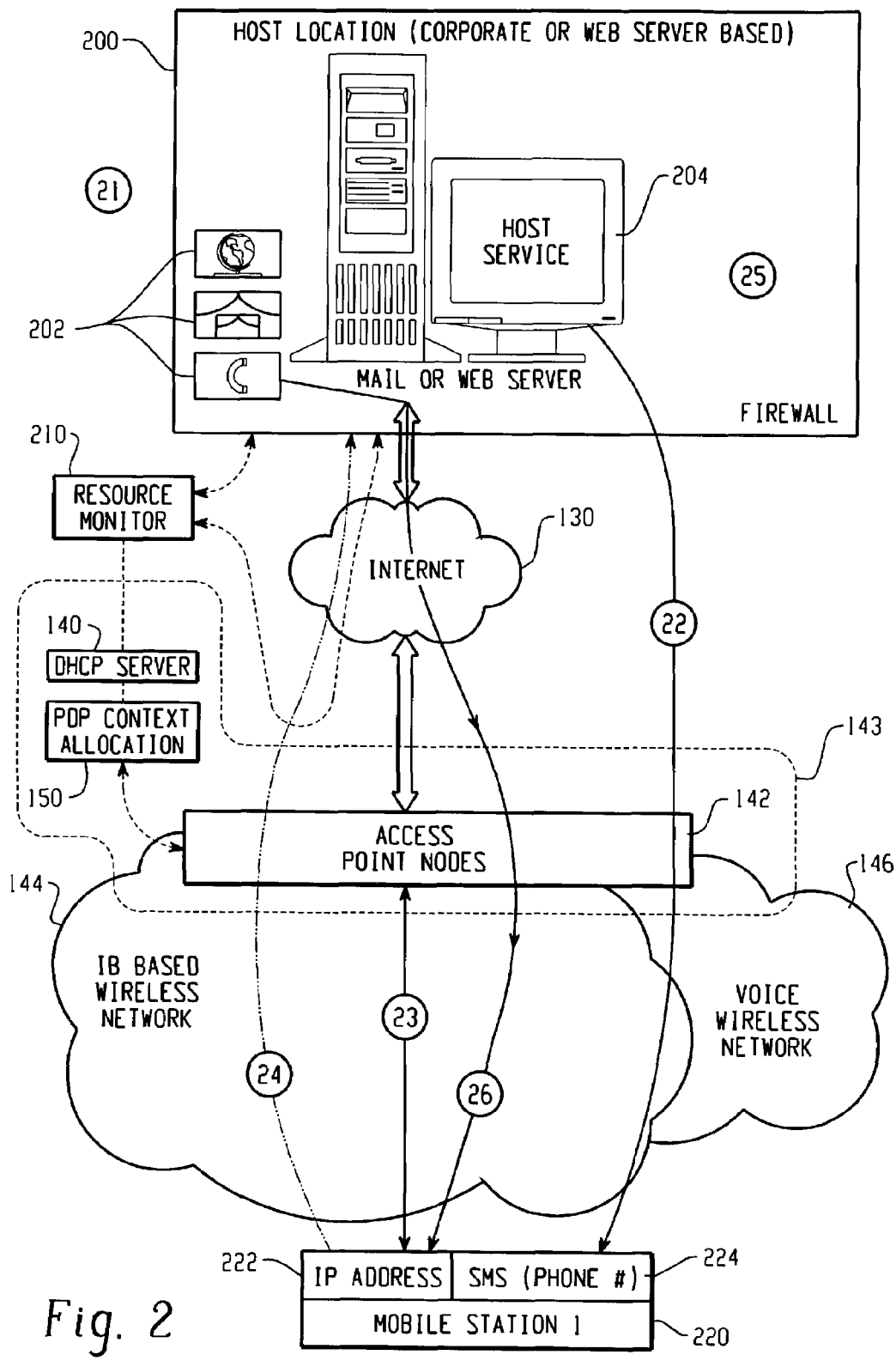
FIG. 2 is an illustration of an embodiment of the system that provides IP tunneling between a mobile station and a host system.

FIG. 2 is an illustration of an embodiment of the system that provides IP tunneling between a mobile station 220 and a host system 200. The host system 200 illustratively comprises a host service 204, such as a mail or web server computer device as described with reference to FIG. 1.

Steps 21–26 describe the process of pushing information from the host system 200 to the mobile station 220. In this embodiment, the network infrastructure 143 provides tunneling of IP packets from the Internet 130 to the mobile station 220. Such tunneling is supported through a network address translation (NAT) router, or by using a virtual private network (VPN), which is available from a wide variety of network vendors such as Cisco Systems and Nortel Networks.

Step 21 occurs upon the arrival of information data items 202 that are to be pushed to a mobile station 220. The data items 202 can be, for example, e-mail messages, web site requests, search requests, database inquiries, phone calls, calendar alarms, to-do list items, workgroup related items, voice mail messages or database items that have changed, CRM or ETP data items, etc. Data items 202 associated with the mobile station 220 are pushed to the mobile station. A data item 202 is associated with the mobile station 220 if it is addressed directly to the mobile station, or addressed to an electronic address at which data items 202 are repeated to the mobile station. Other association methods may also be used.

Although not required in the system, a resource monitor, such as a DHCP monitor/database server 210, can be in communication with the network 144. The resource monitor 210 may communicate with the host service 204 via the networks 144 and/or 130, or alternatively may communicate via a separate data channel. The resource monitor 210 monitors DHCP traffic using a TCP/IP port splitter. One such TCP/IP port splitter is available on Cisco System routers as a built-in feature. The resource monitor 210 can provide an automatic update of the status of a network resource, such as the network 144 domain and an IP address or PDP context allocated to the mobile stations 220. The detailed operation of the resource monitor 210 is shown and described with reference to FIGS. 8 and 9.

Upon the arrival of the data item 202, the host service 204 determines if there is a network resource, illustratively an IP address, allocated for the mobile station 220. The IP address shown in mobile station 220 is simply representative of the data portion of the dual-mode mobile station 220 capable of both voice and data communications. The determination of whether there is a network resource allocated to the mobile station 220 may be made, for example, by accessing resource allocation status data of mobile stations stored at the host service 204. If there is no IP address allocated to the mobile station 220, or if NAT and VPN services are not available from the IP-based wireless network 144, then the host service 204 performs step 22, and sends a resource request message to the mobile station 220 via an out-of-band communication channel. One such out-of-band communication is an SMS message. SMS services are provided by an SMS Center, which is included in the network infrastructure 143. The SMS message utilizes the mobile station's 220 Mobile Station International ISDN Number (MSISDN) or phone number 224 for addressing. The SMS Phone number value shown in mobile station 220 is simply representative of the voice portion of the dual-mode mobile station 220 capable of both voice and data communications.

The SMS Phone number value shown in mobile station 220 is simply representative of the voice portion of the dual-mode mobile station 220 capable of both voice and data communications. Although the SMS message can be sent over the voice or data protocols implemented in base station 148, the MSISDN is still used for out-of-band addressing and an IP data exchange is not involved with the transfer of information.

The resource request message includes a command indicating that the mobile station 220 should setup a PDP context and acquire an IP address. The SMS message may arrive on either the voice network 146 or, in a network such as GSM/GPRS, on the data network 144, as a GSM/GPRS network supports SMS messaging. Although in a GPRS network the network resource is a PDP Context, in other IP-based wireless networks other corresponding network resources may be acquired.

The resource request message also includes data that indicates whether the resource monitor 210 is in communication with the DHCP server 140. Upon receiving the resource request message, the mobile station 220 performs all necessary steps in step 23 to acquire the network resource, such as the IP address 222. The process of acquiring the network resource may vary depending on the type of wireless network and the communication protocol implemented in the network. For example, step 23 would result in the establishment of a PDP context in a GPRS network if a PDP context were not already present.

In another embodiment, acquiring network resource by the mobile station 220 is subject to user intervention. In this embodiment, the user is notified via the SMS message received at the mobile station 220 that a data item is pending delivery to the mobile station 220. The user is then able to determine the content of the data item via a small portion of the data item being displayed on an I/O device in the mobile station 220 and determine if they are willing to pay for delivery of the entire data item.

Once the IP address 222 is acquired by the mobile station 220, the mobile station 220 checks the resource request message to determine if it needs to transmit the new IP address 222 to the host service 204. If the resource request message indicates that the resource monitor 210 is in communication with the DHCP server 140, then the resource monitor 210 will automatically send the new IP address 222 of the mobile station 220 to the host service 204, and thus the mobile station 220 need not send the IP address 222 to the host service 204.

However, if the resource request message indicates that the resource monitor 210 is not in communication with the DHCP server 140; or indicates that no resource monitor 210 is present; or indicates that the mobile station 220 is required to transmit the IP address 222 to the host service 224, then the mobile station transmits the IP address 222 to the host service 204 over the wireless network 144, as shown in step 24. The transmission of the IP address 222 is according to the normal process in which transmissions occur over the wireless network 144, such as by using TCP/IP and/or HTTP commands to exchange either HTML data or other information. In an alternative embodiment, the IP address 222 is transmitted back to the host service 224 via an out-of-band message.

When the host service 204 receives the new IP address, either from the resource monitor 210 or from the mobile station 220 directly, the host service executes step 25 and performs an association between the IP address 222 and the mobile station 220. Once this association is made, step 26 is executed to send the information to the mobile station 220.

Figure 3:
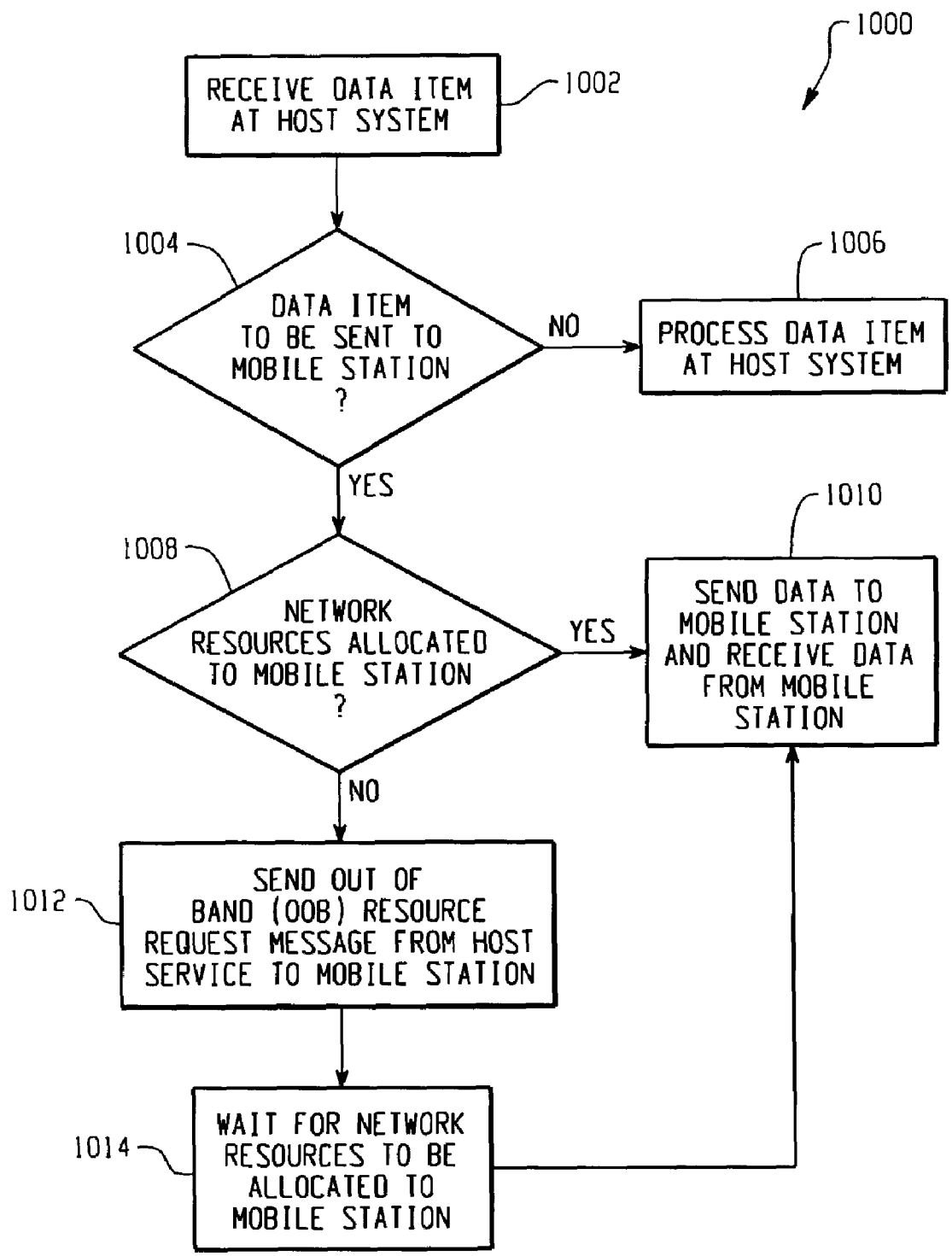
FIG. 3 is a flow diagram illustrating a method of managing information distribution to mobile stations in a wireless network carried out at a host system.

FIG. 3 provides a flow diagram 1000 illustrating a method of managing information distribution to mobile stations in a wireless network carried out at a host system. In step 1002, a data item is received at the host system. In step 1004, the host system determines if the data item is to be transmitted to a mobile station. If the data item is not to be transmitted to a mobile station, then the data item is processed at the host system in step 1006.

If the data item is to be transmitted to a mobile station, however, then in step 1008 the host system determines if a network resources is allocated to the mobile station. The host system may store a network resource allocation table, for example, which indicates whether particular mobile stations have been allocated a network resource, such as an IP address or a PDP context.

If the host system determines that a network resource has been allocated to the mobile station, then the data item is sent to the mobile station, as shown in step 1010. Alternatively, if the host system determines that a network resource has not been allocated to the mobile station, or that the network resource is no longer valid, then the host system sends an out-of-band resource request message to the mobile station in step 1012, and then waits for the network resource to be allocated to the mobile station, as shown in step 1014. One common way to determine the validity of the network resource is to run an idle timer that corresponds to the configured IP-based wireless network 144 idle timer.

Once the network resource is allocated to the mobile station, the host system may be notified by either the mobile station directly, or by a resource monitor in communication with a wireless network accessed by the mobile station. The data item is then sent to the mobile station from the host system, as shown in step 1010.

Figure 4:
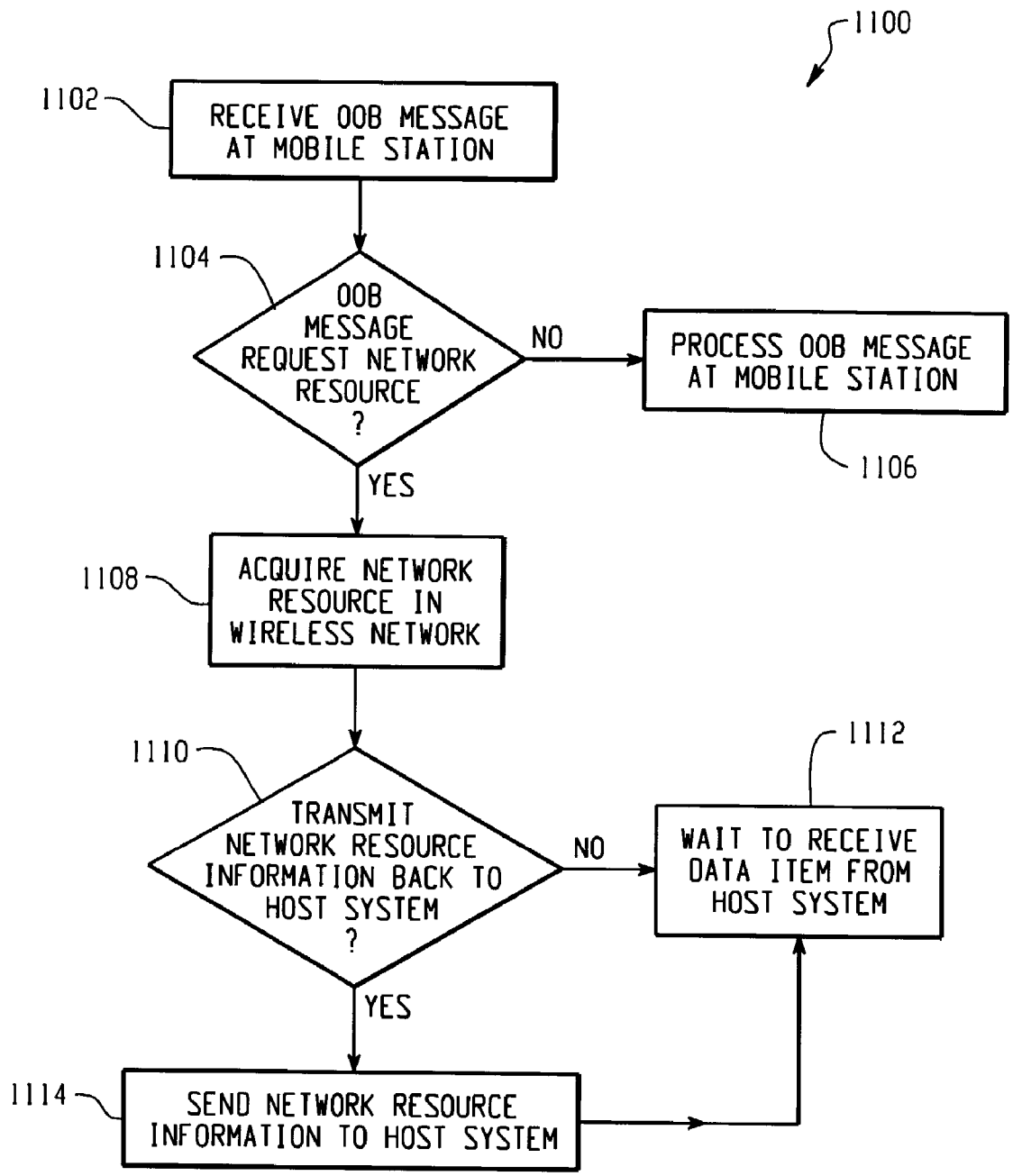
FIG. 4 is a flow diagram illustrating a method of managing information distribution to mobile stations in a wireless network carried out at a mobile station.

FIG. 4 is a flow diagram illustrating a method of managing information distribution to mobile stations in a wireless network carried out at a mobile station. In step 1102, the mobile station receives an out-of-band message transmitted from the host system. In step 1104, the mobile station determines if the out-of-band message is a resource request message. If the out-of-band message is not a resource request message, then the message is processed at the mobile station, as shown in step 1106.

If the out-of-band message is a resource request message, however, then the mobile station obtains the necessary network resources, such as an IP address and/or a PDP context, in step 1108. In step 1110, the mobile station determines if it is required to transmit information regarding the acquired network resource back to the host system. This determination may be based on additional data in the resource request indicating whether a resource monitor is in communication with the wireless network accessed by the mobile station, for example. If the mobile station is not required to transmit information regarding the acquired network resource back to the host system, then the mobile station waits to receive the data item from the host system, as shown in step 1112. If the mobile station is required to transmit information regarding the acquired network resource back to the host system, however, then the mobile station transmits the information in step 1114, and then the mobile station waits to receive the data item from the host system, as shown in step 1112.

Figure 5:
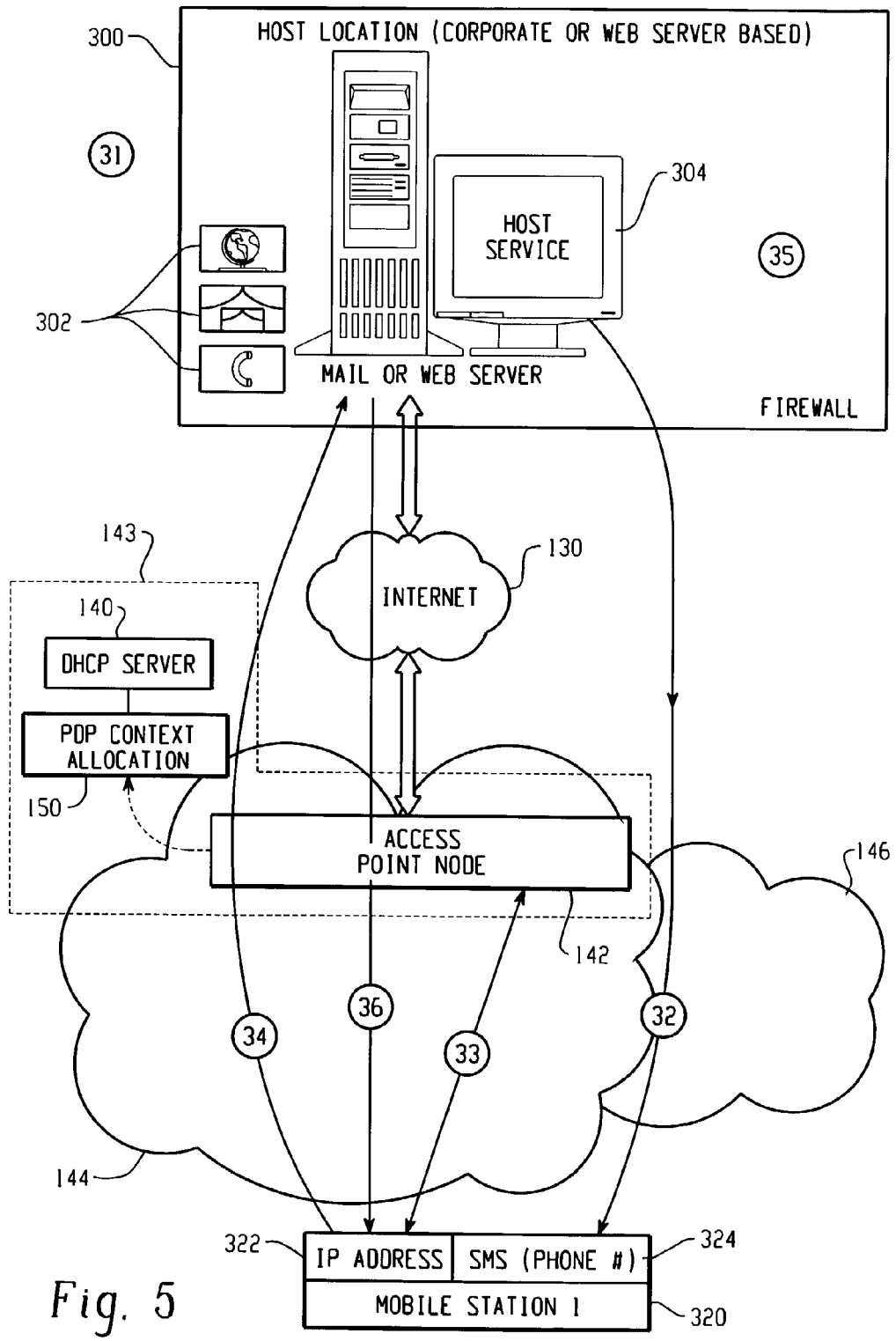
FIG. 5 is an illustration of an embodiment of the system that provides an HTTP communication between a mobile station and a host system.

FIG. 5 is an illustration of an embodiment of the system that provides an HTTP communication between a mobile station 320 and a host system 300. The host system 300 illustratively comprises a host service 304, such as a mail or web server computer device as described with reference to FIG. 1.

Steps 31–36 describe the process of pushing information from the host system 300 to the mobile station 320. In this embodiment, the network infrastructure 143 does not provide tunneling of IP packets from the Internet 130 to the mobile station 320. Instead, the mobile station 320 uses HTTP to communicate information directly to the host service 304. HTTP is supported in a variety of wireless networks, and thus the mobile station 320 may make conventional HTTP requests. Thus, the mobile station 320 and host service 304 perform a normal HTTP get and put, or get and post, whichever is best suited to the particular situation. The same URL value will be used to associate the request with the response. Furthermore, the PDP Context allocation service 150 and the DHCP server 140 are not monitored by a resource monitor.

As shown in FIG. 5, step 31 results in the arrival of a data item 302 for the mobile station 320. Upon the arrival of the data item 302, the host service 304 determines if a network resource is allocated to the mobile station 320. If there is no network resource allocated to the mobile station 320, then the host service 304 performs step 32, and sends a resource request message to the mobile station 320 via an out-of-band communication channel. Because there is no tunneling support, the host service 304 cannot reach the mobile station 320 using traditional TCP/IP or UDP/IP means. Thus, the host service 304 must transmit an out-of-band message to the mobile station 320 as an indicator that the data item 302 is pending for delivery to the mobile station 320. Again, the out-of-band communication is illustratively an SMS message.

Step 33 occurs if the mobile station 320 does not already have an allocated network resource, such as an assigned IP address. In a GSM/GPRS network, this may also involve requesting a PDP context activation, which results in the assignment of an IP address value. In either situation the mobile station 320 acquires an IP address and is then able to make an outgoing HTTP request using the network infrastructure 143, as shown in step 34.

The outgoing HTTP request is addressed to a URL associated with the host system 300. The URL may be stored in a memory subsystem of the mobile station 320, or it may be provided to the mobile station 320 via the out-of-band resource request message. The wireless network 144 includes a conventional firewall/proxy server in the network infrastructure 143 and the mobile station 320 makes the request to the APN 142, which in turn determines the exit point to all connected host services outside the network 144.

Step 35 occurs as the host service 304 receives the HTTP request from a mobile station and matches it to a known mobile station 320. This association can be accomplished in several ways, such as by using HTTP-based cookies to track the progress of request/response stages to ensure the mobile station 320 is receiving data. Step 36 results in the host service 304 fulfilling the HTTP request from the mobile station 320 through the appropriate HTTP response, and thus the data item 302 is provided to the mobile station 320.

Figure 6:
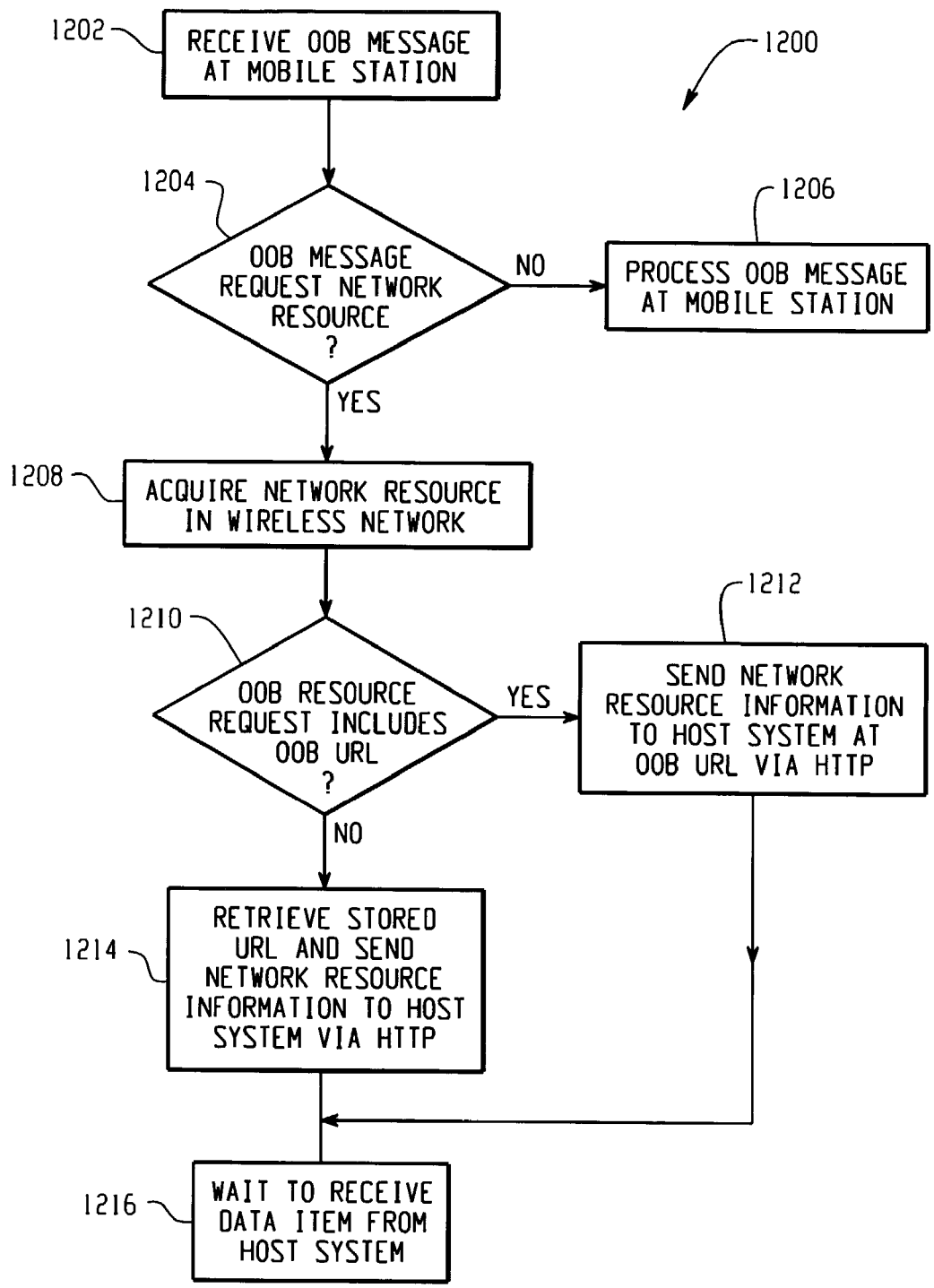
FIG. 6 is a flow diagram illustrating another method of managing information distribution to mobile stations in a wireless network carried out at a mobile station.

FIG. 6 provides a flow diagram 1200 illustrating another method of managing information distribution to mobile stations in a wireless network carried out at a mobile station according to the embodiment of FIG. 5. In step 1202, the mobile station receives an out-of-band message transmitted from the host system. In step 1204, the mobile station determines if the out-of-band message is a resource request message. If the out-of-band message is not a resource request message, then the message is processed at the mobile station, as shown in step 1206.

In another embodiment, the out-of-band message may also contain the current cookie value for the mobile station, maintained by the host system. The cookie value can be used on the subsequent request to reduce overhead and ensure the host system and the mobile station are in synchronization.

If the out-of-band message is a resource request message, however, then the mobile station obtains the necessary network resources in step 1208. In step 1210, the mobile station determines if the out-of-band resource request included an URL. If the out-of-band resource request includes an URL, then the mobile station sends information related to the acquired network resource to the host system addressed by the URL via HTTP, as shown in step 1212. If the out-of-band resource request does not include an URL, however, then the mobile station retrieves an URL stored in its memory subsystem and sends information related to the acquired network resource to the host system addressed by the stored URL via HTTP, as shown in step 1214. The mobile station then waits to receive the data item from the host system, as shown in step 1216. By establishing a cookie method the host system can ensure the current HTTP request is from the correct user and maintain better security standards.

Figure 7:
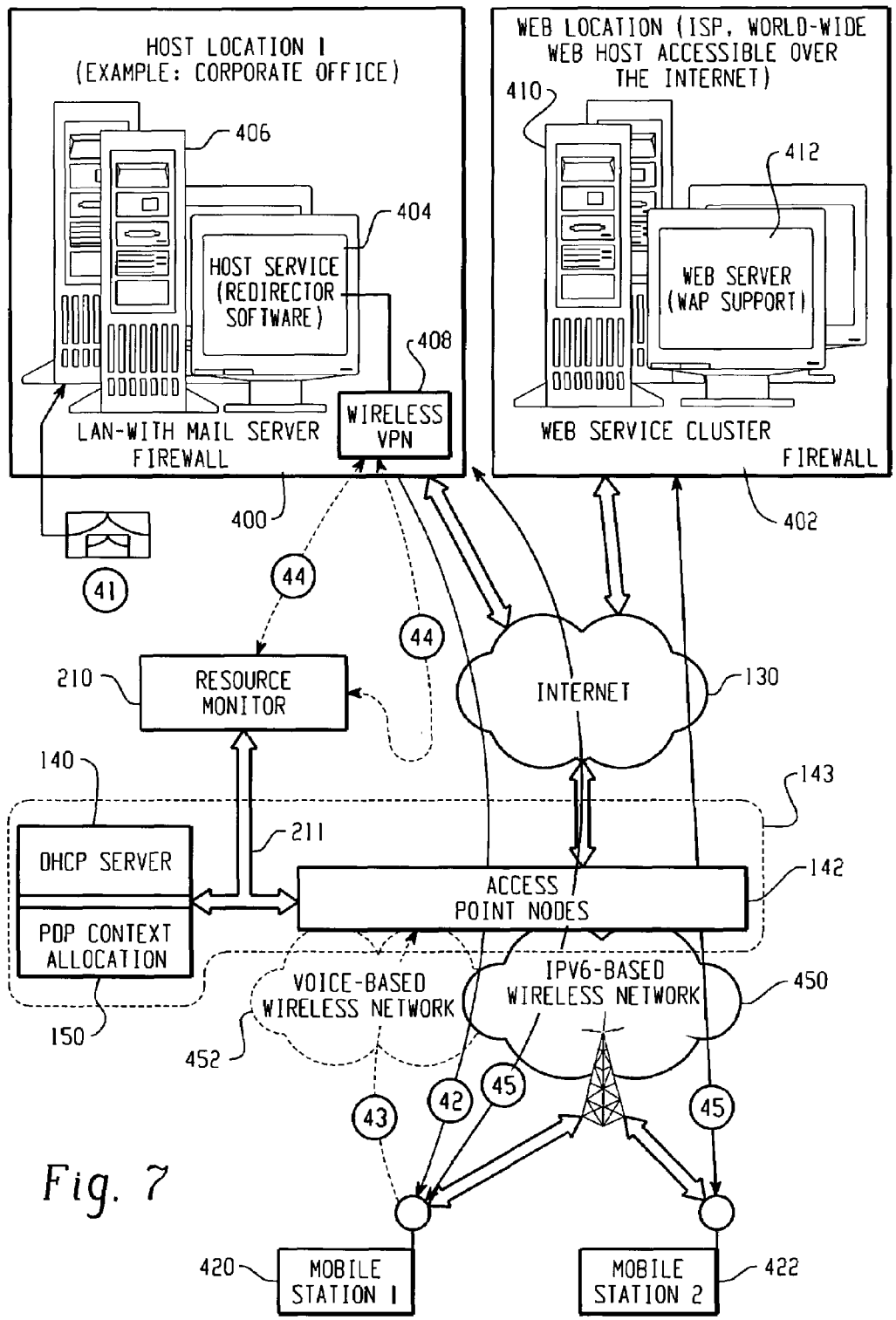
FIG. 7 is an illustration of an embodiment of the system for managing information distribution to mobile stations in an IPv6 wireless network.

FIG. 7 is an illustration of an embodiment of the system for managing information distribution to mobile stations in an IPv6 wireless network 450. The wireless networks 450 and 452 can support both voice and data communications in a manner as similarly described with networks 144 and 146. The voice-based wireless network 452 provides voice communication to the mobile stations 420 and 422. The wireless network 450 is an IPv6-based network that provides other data communication capabilities for the mobile stations 420 and 422, such as receiving and sending e-mail, documents, files, and the like.

While the networks 450 and 452 each provide different communication capabilities as described above, the network 450 may also be capable of supporting voice over IP (VoIP). Of course, traditional addressing to the mobile station for voice communications (e.g., a cell phone number) may still be implemented. Furthermore, the network infrastructure 143 supports conventional services such as SMS message exchange, Internet web access, PDP Context allocation 150 and DHCP address management 140.

The IP address in the network 450 is an IPv6 address, which is a 16-byte address instead of the 4-byte address of an IPv4 address. Because the 16-byte address in the IPv6 network 450 supports virtually unlimited addressing, the mobile stations 420 and 422 are provided a permanent or semi-permanent IPv6 address. A permanent address is an address that does not change, e.g. the address may be stored in a Subscriber Identity Module (SIM) in the mobile station, or stored in a PROM or FLASH memory in the mobile station. A semi-permanent address is an address that does not change for a long period, e.g., an address is assigned to the mobile station pursuant to a subscription agreement granting access to the network 450 and revoked only when the agreement in terminated. Other methods of providing a semi-permanent address may also be used.

Thus, in most situations the address of the mobile stations 420 and 422 will have an IP address that will not change. Accordingly, once an address is assigned to a mobile station, the address can be virtually dedicated to the mobile station. Of course, there are situations when an address may be reassigned, such as theft or destruction of the mobile station, or termination of an access agreement.

FIG. 7 illustrates exemplary exchanges of data, the first with a host system 400 and the second with a web server 412 located at a web location 402. The host system 400 comprises a host service 406, such as a mail server, running a redirector program 404. A VPN server 408 allows users to connect to corporate services via the Internet 130. If the IPv6 address is provided to the host service 406, and the PDP context for the mobile station 420 is active, data items may be exchanged between the mobile station 420 and the host service 406, as shown by step 45.

If the host service 406 does not have the IPv6 address for the mobile station 420, then data items may not be pushed from the host service 406 to the mobile station 420. The IPv6 address of the mobile station 420 may be provided to the host service 406 via an out-of-band communication from the mobile station 420 to the host service 406, such as by a user-initiated communication between the mobile station 420 and the host service 406. Alternatively, the IPv6 address may be provided via an HTTP communication from the mobile station 420. For example, a user may desire access to a web server 410 providing WAP support service 412. The user may contact the web server 410 via an HTTP communication to provide the IPv6 address to the mobile station 420, and possibly other information, to gain access to the web server 410.

While the mobile station 420 does not need to acquire a dynamic IP address, the mobile station 420 still needs to acquire network resources, such as a PDP context, to communicate over the network 450. The PDP context is a valued network resource that terminates in the network APNs. Because the network 450 must dedicate resources to maintain the PDP context, the PDP context is often released if the mobile station 420 is idle for a given time so that other mobile stations may communicate over the network 450. When the PDP context is released, the capability to route data to the mobile station 420 terminates. Thus, PDP contexts are still limited despite the fact that the mobile station 420 has a permanent IPv6 address.

The system provides the host service 406 the ability to track the network resources allocated to the mobile station 420, and to instruct the mobile station 420 to obtain the network resources as needed. If a resource monitor 210 is in communication with the network 450, then fewer data exchanges are required to establish communication between the mobile station 420 and the host service 406. Steps 41 and 42 are similar to the steps 21, 22 and 31, 32 as previously described, wherein the host service 406 sends an out-of-band resource request message to the mobile station 420 to inform the mobile station 420 that a data item is pending.

In one embodiment, the host service 406 tracks an idle period for the mobile station 420 to determine whether an active PDP context is associated with the mobile station 420 before transmitting the resource request message. If the host service 404 determines that the mobile station 420 should have an active PDP context, then the data item is transmitted to the mobile station 420. If an error message is received at the host service 406 as a result of the transmission of the data item (e.g., the data item could not be delivered because the PDP context is not associated with the IPv6 address of the mobile station 420), then a resource request message is transmitted to the mobile station 420.

If there is no active PDP context associated with the mobile station 420, then step 42 is executed and the resource request message is transmitted to the mobile station 420. The mobile station 420 then executes step 43 and requests a PDP context activation, providing its IPv6 address to be associated with the PDP context.

Once the PDP context is allocated to the mobile station 420, the mobile station 420 may communicate with the host service 406. In one embodiment, a resource monitor 210, such as a DHCP monitor or a PDP context monitor, monitors the resource status of network resources allocated to the mobile station 420. The resource monitor monitors the status of network resources controlled by the DHCP server 140 and the PDP Context Allocation service 150 via the TCP/IP splitter 211. The status is provided to the host service 406 automatically upon any change in state of the status, as shown in step 44. This resource status may be provided only to the host service 406 associated with the mobile station 420, or it may be broadcast to a plurality of host services.

Data items may then be exchanged between the mobile station 420 and the host service 406, as shown by step 45.

In one embodiment, the network infrastructure 143 supports full two-way, asynchronous communications between the mobile station 420 and the host service 406 at any time, provided a PDP context is active. In another embodiment, the mobile station 420 may initiate an HTTP-Get operation and receive data item in an HTTP-Post or Put operation.

Figure 8:
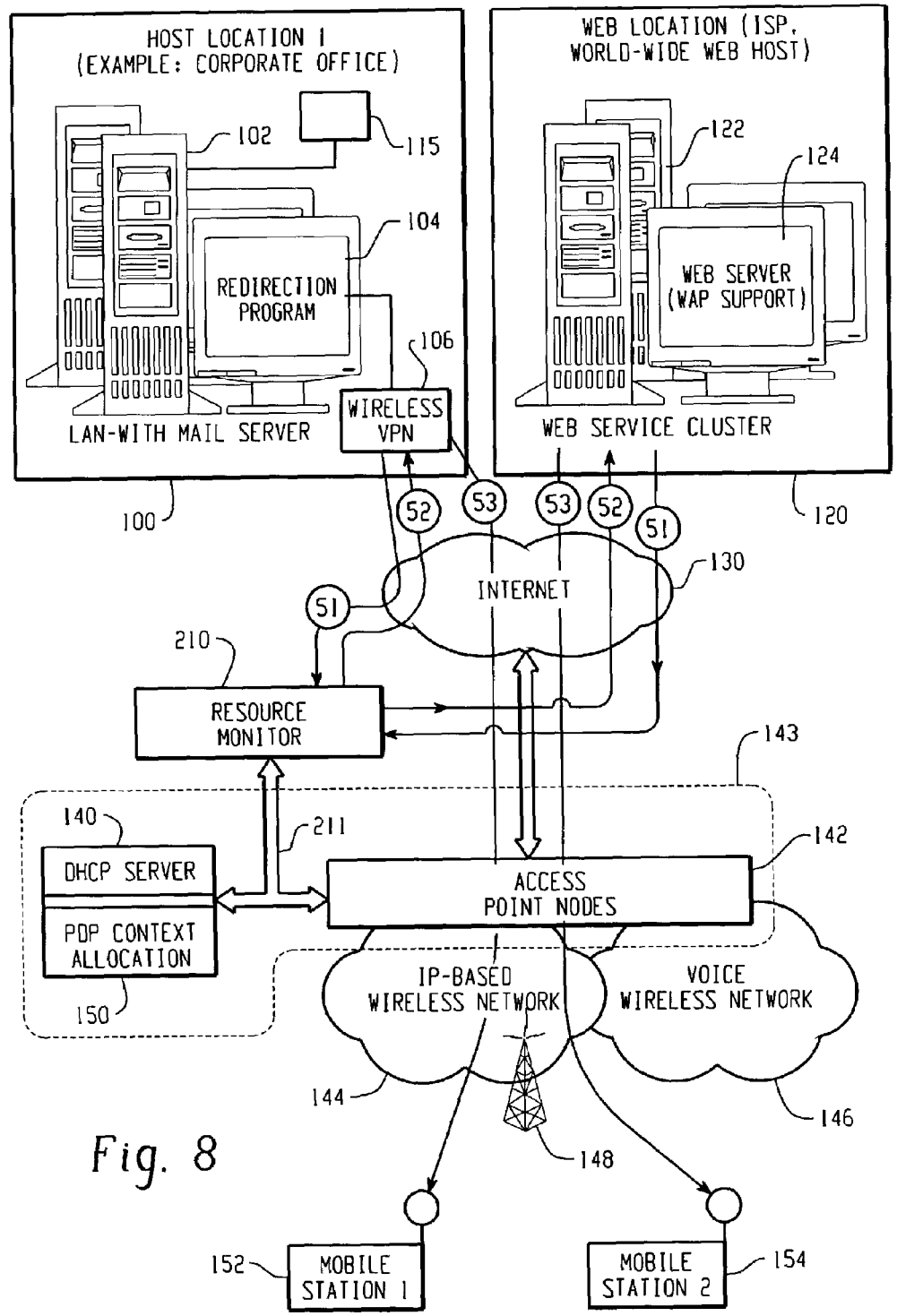
FIG. 8 is an illustration of an embodiment of the system that includes a network resource monitor in communication with the wireless network and the host system.

FIG. 8 is an illustration of an embodiment of the system that includes a network resource monitor 210 in communication with the wireless network 144 and host systems 100 and 120. Steps 51–53 illustrate the process of the network resource monitor 210 providing a resource status of mobile stations 152 and 154 to the host systems 100 and 120. The resource monitor monitors the status of network resources controlled by the DHCP server 140 and the PDP Context Allocation service 150 via the TCP/IP splitter 211. The host system 100 is associated with mobile station 152, and the host system 120 is associated with mobile station 154. The network resource monitor 210 communicates with both host systems 100 and 120. Thus, while steps 51–53 are described with reference to host system 100 and mobile station 152, the same process may also be carried out with respect to host system 120 and mobile station 154.

The resource monitor 210 may communicate with the host service 204 via the networks 144 and/or 130, or alternatively may communicate via a separate data channel. For example, the communication between the resource monitor 210 and the host service 204 could be carried over a dedicated, point-to-point link like ISDN, or it could be carried over a VPN connection through the Internet 130. The VPN connection method would be used to increase security and ensure traffic between the two point is not monitored or attacked by hackers.

During the execution of step 51, initialization data is sent from the host system 100 to the resource monitor 210. The initialization data indicates that a new host system 100 is present to receive data from and send data to mobile stations in communication with the wireless networks 144 and 146, and to receive network resource status updates related to the mobile stations.

In another embodiment, the host system 100 provides a list of associated mobile stations to the resource monitor 210. Thus, the resource monitor 210 can associate particular mobile stations with the host system 100, and provide network resource status updates related only to those mobile stations to the host system 100. In this embodiment, the host system 100 provides a list to the resource monitor indicating that the host system 100 is associated with the mobile station 152.

The host system 100 may be associated with a mobile station by several methods. In one embodiment, the mobile station is associated with the host system 100 when the mobile station mates with a serial port 115 on a network owned by the host system 100 and exchanges private key information used for encrypting information. In another embodiment the mobile station is associated with the host system 100 when the mobile station logs into a secure web site and registers with the host system 100.

This list of associated mobile stations allows the resource monitor 210 to build an associative table mapping the mobile stations to a specific host system. This function may be carried out by a conventional database server located in the resource monitor 210, such as a LDAP server, an Oracle Server, a Microsoft database server, or any network-based technology that can perform address mapping.

Step 52 is executed whenever the mobile station 152 is allocated a network resource, such as an IP address. Step 52 can also be executed when a new PDP Context is assigned and a new IP address is not required, i.e. in the case of mobile station in an IPv6 network requiring a new PDP context for its associated IP address. Step 52 could also be executed if the IP address is revoked from the mobile station 152, or if the PDP context is released. In all cases, execution of step 52 provides the host system 100 resource status information regarding the resource status of the mobile station 152. Once a change to the status of the mobile station 152 occurs, the resource monitor 210 is informed of this change via the TCP/IP port splitter 211.

In an alternative embodiment, the resource monitor 210 monitors the network resource status via network router commands that cause a mirroring of TCP/IP traffic on two ports, and thus the TCP/IP port splitter 211 may not be required. If a mapping table entry is present within the resource monitor 210, then changes in the resource status are provided to the specific Host Location 100 or 120 associated with the mobile station 152 or 154.

If no such mapping table entry exists, then the newly allocated or deallocated network resources may be broadcast to all host systems. In another embodiment, if the mobile station 152 or 154 is not associated with a particular host location 100 or 120, then a network resource status change, such as a change in an IP address or PDP context, is ignored by the resource monitor 210.

Step 53 is executed to exchange data between the host system 100 and the mobile station 152 once the updated resource status of the mobile station 152 has been delivered to the host stations 100. The data exchange can occur via HTTP, or directly over the Internet using TCP or UDP, as previously described.

In another embodiment, the resource monitor 210 provides the resource status and mobile station associations to all registered host systems, and thus each registered host system may communicate with each mobile station, regardless of the mobile station association.

Figure 9:
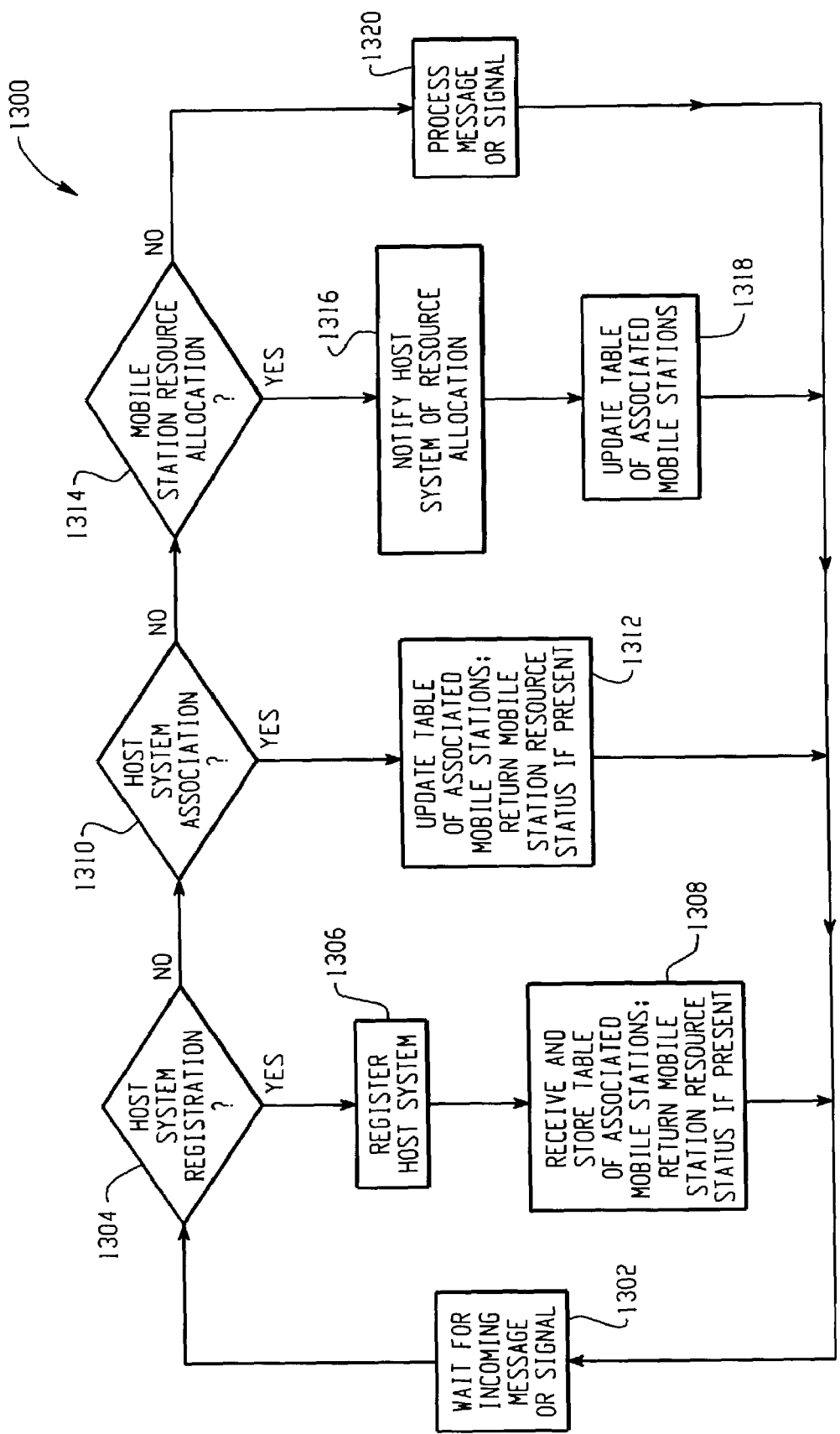
FIG. 9 is a flow diagram illustrating a method of managing information distribution to mobile stations in a wireless network carried out at a network resource monitor.

FIG. 9 provides a flow diagram 1300 illustrating a method of managing information distribution to mobile stations in a wireless network carried out at a network resource monitor. In step 1302, the resource monitor waits for an incoming message or signal. In step 1304, the resource monitor determines if the incoming communication is a host system registration, such as would occur when a new host system is connected to the Internet, for example.

If the incoming communication is a host system registration, then in step 1306 the host system is registered in the network resource monitor. Registration of the host system includes, for example, the step of storing the URL of the host system in a database accessible by the resource monitor. Upon registration of the host system, the resource monitor retrieves and stores a table of mobile stations that are associated with the host system, and returns the mobile station resource status, if present, so that the host system has a starting point with its own device status table, as shown in step 1308. Thus, the resource monitor can associate a particular mobile station with its associated host system and provide resource status related to the particular mobile station only to its associated host system.

If the incoming communication is not a host system registration, then the resource monitor determines if the incoming communication is a host system association update, as shown in step 1310. A host system association update may include the addition or deletion of an associated mobile station in a corresponding host system table of associated mobile stations. If the incoming communication is a host system association update, then the corresponding table of associated mobile stations is updated, and the mobile station resource status, if present, is returned, as shown in step 1312.

If the incoming communication is not a host system association update, then the resource monitor determines if the incoming communication is a mobile station resource allocation update, as shown in step 1314. A resource allocation update may occur when a mobile station is assigned a new dynamic IP address, is allocated a PDP context, or if an assigned IP address is released or an allocated PDP context is released, and the like. If the incoming communication is a mobile station resource allocation update, the resource monitor looks up the associated host systems that have an association with this mobile station, and then notifies the associated host system of the resource allocation update to the mobile station, as shown in step 1316. In step 1318, the table of associated mobile stations is updated to reflect the current resource status of the mobile station. If the incoming communication is a mobile station resource is not an allocation update, then the communication is processed at the resource monitor, as shown in step 1320.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A method of distributing information from a host service in communication with a computer network to a mobile station in communication with a wireless network, the method comprising the steps of:

receiving a data item associated with the mobile station at the host service;

providing a network resource monitor in communication with the host service and the wireless network, the network resource monitor automatically providing network resource status information for the mobile station to the host service;

determining at the host service whether a network resource of the wireless network is currently associated with the mobile station;

if the network resource of the wireless network is not currently associated with the mobile station, then transmitting resource request message from the host service to the mobile station to instruct the mobile station to acquire the network resource, wherein after the mobile station acquires the network resource, the network resource monitor automatically provides the network resource status of the mobile station to the host service; and transmitting the data item to the mobile station using the network resource.

2. The method of claim 1, wherein the step of determining at the host service whether a network resource is associated with the mobile station comprises the steps of:

receiving a network resource status from the network resource monitor indicating network resources associated with the mobile station; and determining from the network resource status if the network resource is currently associated with the mobile station.

3. The method of claim 1, wherein the step of transmitting band a resource request message from the host service to the mobile station to instinct the mobile station to acquire the network resource comprises the steps of:
- transmitting a first instruction to cause the mobile station to acquire the network resource; and
- transmitting a second instruction to cause the mobile station to transmit a confirmation message to the host service upon acquiring the network resource.

4. The method of claim 1, wherein the step of transmitting a resource request message from the host service to the mobile station to instruct the mobile station to acquire the network resource comprises the steps of:
- transmitting an instruction to cause the mobile station to acquire the network resource; and
- transmitting data indicating whether the mobile station is required to transmit a confirmation message tat the mobile station has acquired the network resource to the host service.

5. The method of claim 1, wherein the network resource is an Internet Protocol (IP) address.

6. The method of claim 1, wherein the network resource is a Packet Data Protocol (PDP) context.

7. The method of claim 1, wherein the resource request message is an SMS message transmitted from the host service to the mobile station over a wireless voice network.

8. The method of claim 1, further comprising the steps of:
- the host service registering with the network resource monitor to receive automatic updates regarding the network resource status of the mobile station; and
- storing registration data regarding the host service and the mobile station at the network resource monitor.

9. The method of claim 1, further comprising the steps of:
- providing a plurality of host services in communication with a plurality of mobile stations;
- each host service registering with the network resource monitor to receive automatic updates regarding network resource status of one or more of the plurality of mobile stations.

10. The method of claim 1, wherein the network resource monitor receives network resource status information for the mobile station from a Dynamic Host Configuration Protocol (DHCP) component of the wireless network.

11. The method of claim 1, wherein the network resource monitor receives network resource status information for the mobile station from a PDP Context Allocation component of the wireless network.

* * * * *

UNITED STATES PATENT AND TRADEMARK OFFICE
CERTIFICATE OF CORRECTION

PATENT NO. : 7,107,341 B2 Page 1 of 1
APPLICATION NO. : 10/313103
DATED : September 12, 2006
INVENTOR(S) : Mousseau et al.

It is certified that error appears in the above-identified patent and that said Letters Patent is hereby corrected as shown below:

Column 13, line 5, please delete "band"

Column 13, line 6, please replace "instinct" with -- instruct --

Column 13, line 20, please replace "tat" with -- that --

Signed and Sealed this

Twenty-third Day of October, 2007

JON W. DUDAS
*Director of the United States Patent and Trademark Office*